United States Patent
Rambert et al.

(10) Patent No.: US 12,071,963 B2
(45) Date of Patent: Aug. 27, 2024

(54) METHOD FOR CONTROLLING A HYDRAULIC SYSTEM

(71) Applicant: Schaeffler Technologies AG & Co. KG, Herzogenaurach (DE)

(72) Inventors: Marc Rambert, Illkirch-Graffenstaden (FR); Nicolas Leriche, Strasbourg (FR)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 18/027,961

(22) PCT Filed: Sep. 14, 2021

(86) PCT No.: PCT/DE2021/100757
§ 371 (c)(1),
(2) Date: Mar. 23, 2023

(87) PCT Pub. No.: WO2022/068991
PCT Pub. Date: Apr. 7, 2022

(65) Prior Publication Data
US 2023/0366417 A1  Nov. 16, 2023

(30) Foreign Application Priority Data
Sep. 29, 2020 (DE) .................. 10 2020 125 335.4

(51) Int. Cl.
*F15B 19/00* (2006.01)
*F15B 20/00* (2006.01)
*F16D 48/02* (2006.01)

(52) U.S. Cl.
CPC ............ *F15B 19/00* (2013.01); *F15B 20/005* (2013.01); *F16D 2048/0245* (2013.01); *F16D 2048/0266* (2013.01); *F16D 2048/0269* (2013.01); *F16D 2500/511* (2013.01)

(58) Field of Classification Search
CPC .................... F15B 19/00; F15B 20/005; F16D 2048/0245; F16D 2048/0266; F16D 2048/0269; F16D 2500/511
See application file for complete search history.

(56) References Cited

U.S. PATENT DOCUMENTS

| | | | |
|---|---|---|---|
| 2010/0152985 A1* | 6/2010 | Petzold | F16D 48/066 701/68 |
| 2018/0106305 A1* | 4/2018 | Baehr | F16D 31/00 |

FOREIGN PATENT DOCUMENTS

| | | |
|---|---|---|
| DE | 102008042129 A1 | 3/2010 |
| DE | 102011075168 A1 | 11/2012 |
| DE | 102015206403 A1 | 10/2016 |
| DE | 102017115484 B3 | 11/2018 |
| DE | 102018209793 A1 | 12/2019 |
| DE | 102019101957 A1 | 7/2020 |

(Continued)

*Primary Examiner* — Kenneth Bomberg
*Assistant Examiner* — Matthew Wiblin

(57) ABSTRACT

A method for controlling a hydraulic system for actuating a drive train device of a drive train of a motor vehicle includes a first volumetric flow of a pressure medium being provided by an electrically operated pump, and a slave cylinder piston of a slave cylinder being actuated along an actuation path, in a manner controlled by a switch valve, via a second volumetric flow generated from the first volumetric flow. A leakage in the hydraulic system is determined from a comparison of the first and second volumetric flows.

20 Claims, 2 Drawing Sheets

(56) References Cited

FOREIGN PATENT DOCUMENTS

| | | |
|---|---|---|
| DE | 102019102249 A1 | 7/2020 |
| DE | 102019127714 B3 | 2/2021 |
| WO | 2017206980 A1 | 12/2017 |
| WO | 2018001408 A1 | 1/2018 |

* cited by examiner

METHOD FOR CONTROLLING A HYDRAULIC SYSTEM

CROSS-REFERENCE TO RELATED APPLICATIONS

This application is the U.S. National Phase of PCT Appln. No. PCT/DE2021/100757 filed Sep. 14, 2021, which claims priority to DE 102020125335.4 filed Sep. 29, 2020, the entire disclosures of which are incorporated by reference herein.

TECHNICAL FIELD

The disclosure relates to a method for controlling a hydraulic system for actuating a drive train device of a drive train of a motor vehicle, in which hydraulic system a first volumetric flow of a pressure medium is provided by an electrically operated pump, and a slave cylinder piston of a slave cylinder is actuated along an actuation path, in a manner controlled by a switch valve, by means of a second volumetric flow generated from the first volumetric flow.

BACKGROUND

The document DE 10 2019 101 957 A1 discloses a hydraulic system for actuating a drive train device, namely a friction clutch and a parking lock. Here, a first volumetric flow is generated by means of an electrically operated pump and a slave cylinder is pressurized by means of a second volumetric flow generated from this first flow. The pump is controlled in a pressure-compensated and temperature-compensated manner.

A method for controlling a hydraulic system is described in the document DE 10 2019 102 249 A1, in which a leakage is determined by detecting a pressure of a pressure medium in the hydraulic system during actuation of the slave cylinder and comparing it with a threshold value.

SUMMARY

The present disclosure, according to an exemplary embodiment, provides a method for controlling a hydraulic system to determine a leakage of the hydraulic system.

The method is used to control a hydraulic system for actuating a drive train device of a drive train of a motor vehicle. In the drive train, a drive unit designed to be purely electric or a hybrid drive unit or exclusively an internal combustion engine can be effective as drive. A transmission with at least one, for example several, automatically shiftable gears can be provided between the drive and the driving wheels driven by it. The transmission can be designed as a dual clutch transmission, wherein a respective friction clutch is effectively arranged between the drive and each of the two transmission input shafts of the dual clutch transmission. A friction clutch can be arranged between the driving wheels and the drive. A drive designed to be purely electric or as a hybrid drive can have a split design in relation to a disconnect clutch, for example by having an electric machine upstream and an electric machine downstream of the disconnect clutch in relation to the driving wheels.

A drive train device is a component that can be linearly actuated and shifted along an actuation path. For example, a drive train device can be provided as a parking lock, a friction clutch, for example as a disconnect clutch, or a brake, for example in an epicyclic gearbox for shifting gear ratios.

The hydraulic system contains a pump, such as a pump with a fixed displacement volume, for example a gear pump, a pump shaft of which is electrically driven by an electric motor. The electric motor is actuated in a controlled manner by a control unit, to generate a predetermined first volumetric flow of a pressure medium by means of the pump. By providing the first volumetric flow, a second volumetric flow is generated by means of a switch valve controlled by the control unit, which actuates and linearly displaces a slave cylinder piston of a slave cylinder along an actuation path for actuating the drive train device.

In order to determine wear occurring over the service life of the hydraulic system, in particular of the pump, a leakage in the hydraulic system is, for example, continuously determined from a comparison of the two volumetric flows and a functional condition of the pump is monitored based on the development of the leakage over time.

For example, a first leakage variable can be determined in an initial state, for example before or shortly after installation of the hydraulic system in the motor vehicle, continuously compared with a currently determined leakage variable and a measure of the leakage and the functional condition can be determined from the comparison.

For example, leakage of the slave cylinder and the switch valve can be neglected, and the determined leakage can be associated exclusively with the pump. In this regard, it has been shown that the leakage of the slave cylinder is substantially zero when it is functioning properly. A malfunction such as defect of the slave cylinder, for example, in the case of a defective lip seal or a broken piston rod, can be determined in another manner, for example, by determining a faulty or non-existent actuation of the drive train device. The leakage of the switch valve is generally negligible compared to the leakage of the pump, even when it is new. With increasing wear, the ratio of the leakages to each other does not change substantially, so that over the lifetime, the leakage of the switch valve can be neglected.

The first volumetric flow can be determined, for example, during actuation of the slave cylinder from a speed of the pump, an electric current of the electric motor driving the pump and mechanical constants of the hydraulic system. The mechanical constants are all influences that occur within the mechanical and geometric structure of the hydraulic system and are determined and considered, for example, by calculation and/or empirically. For example, the mass moment of inertia of a rotor of the electric motor, a pump volume or a delivery volume of the pump can be considered as mechanical constants. Furthermore, temperature-dependent influences such as the viscosity and damping properties of the pressure medium as well as dynamic processes of the flow behavior of the pressure medium within the hydraulic system, for example at narrow points such as in the pump, at the switch valve, orifices and the like, can be considered. The leakage can be determined in a temperature-compensated manner. Corresponding characteristic curves of the hydraulic system such as of the pump, switch valve, pressure line and/or the like can be modeled, calculated and/or empirically determined as a function of the temperature.

The second volumetric flow can be determined, for example, during actuation of the slave cylinder from an effective area such as the piston surface area of the slave cylinder piston and the displacement speed of the slave cylinder piston.

For example, in a simplified manner, the leakage $Q_{leakage}$ is determined from the equation of motion (1):

$$Q_{pump} - Q_{leakage} - Q_{load} = \frac{V}{\beta}\frac{dP}{dt} \quad (1)$$

with the first volumetric flow $Q_{pump}$ generated by the pump, the second volumetric flow $Q_{load}$ occurring at the slave cylinder during an actuation, the pump volume V, the compressibility constant β and the partial differential dP/dt of the pressure of the pressure medium after the time t. The leakage $Q_{leakage}$ is already to be considered the leakage of the pump neglecting the leakages of the switch valve and the slave cylinder.

According to equation (2), the first volumetric flow $Q_{pump}$ is obtained from the volume $V_d$ displaced by the pump, taking into consideration the compressibility of the pressure medium with a compressibility constant, which can be dependent on the temperature, and the angular velocity $\dot\theta$ of the rotor of the electric motor or pump shaft:

$$Q_{pump} = V_d \dot\theta \quad (2)$$

The second volumetric flow load is 0 determined using equation (3) from:

$$Q_{load} = A_{piston} \cdot \dot x \quad (3)$$

with the piston surface area $A_{piston}$ of the slave cylinder piston and its displacement speed $\dot x$ along its actuation path x.

From the mechanical equation (4) with the mass moment of inertia J of the rotor, the angular acceleration $\ddot\theta$ of the rotor and its viscous damping d, the partially differentiated pressure dp/dt of equation (1) can be calculated:

$$J\ddot\theta = C_m - V_d P - d\dot\theta \quad (4)$$

with the motor torque $c_m$ of equation (5):

$$C_m = i \cdot K_e \cdot \eta \quad (5)$$

from which the current i of the electric motor can be correlated with the first volumetric flow $Q_{pump}$. In equation (5), $K_e$ is the motor constant and η is the efficiency of the electric motor.

Neglecting friction, the pressure p can be calculated from equations (4) and (5) according to equation (6):

$$P = \frac{-J\ddot\theta - d\dot\theta + i \cdot K_e \cdot \eta}{V_d} \quad (6)$$

By combining and transforming equations (1)-(3) and (6), equation (7) provides the leakage $Q_{leakage}$ depending on the rotational parameters and the current i of the electric motor, which are available in the control unit or can be detected and evaluated:

$$Q_{leakage} = \dot\theta V_d - \frac{V}{\beta \cdot V_d} \frac{d(-J\ddot\theta - d\dot\theta + i \cdot K_e \cdot \eta)}{dt} - A_{piston} \dot x \quad (7)$$

BRIEF DESCRIPTION OF THE DRAWINGS

The disclosure is explained in more detail with reference to the exemplary embodiment shown in FIGS. 1 to 3. In the figures.

DETAILED DESCRIPTION

Figure 1:
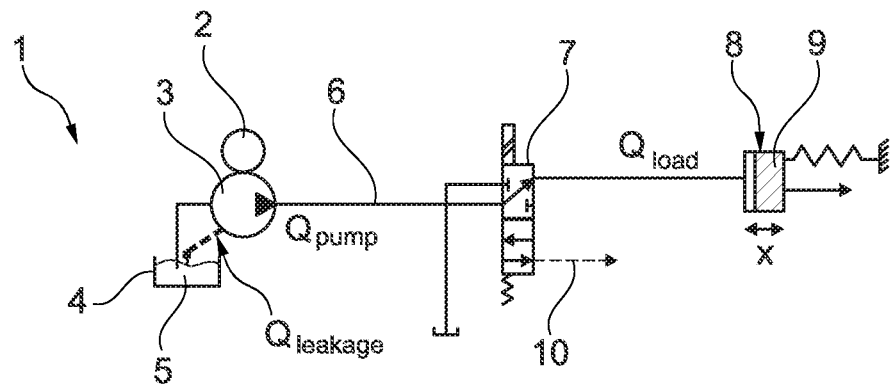
FIG. 1 shows a schematic representation of a hydraulic system for actuating two drive train devices.

With reference to the above equations (1) to (7), FIG. 1 shows the schematically illustrated hydraulic system 1 for actuating two drive train devices, which are not explicitly shown, and the determination of its leakage.

The hydraulic system 1 contains the pump 3 driven by the electric motor 2, which sucks pressure medium 5 from the sump 4 and delivers it to the pressure line 6.

The pressure line 6 leads to the switch valve 7, which alternatively connects to the slave cylinder 8 with the slave cylinder piston 9 displaceable along the actuation path x for actuating a parking lock (not shown) as one of the drive train devices in order to actuate it. Alternatively, the switch valve 7 connects the pressure line 6 to a slave cylinder (not shown) similar to the slave cylinder 8 along the arrow 10 for actuating a drive train device designed as a disconnect clutch of the drive train.

The leakage of the hydraulic system 1 is limited to the determination of the leakage $Q_{leakage}$ of the pump 3, since the leakages of the switch valve 7 and the slave cylinder 8 are negligible. The leakage $Q_{leakage}$ is determined by comparing the first volumetric flow $Q_{pump}$ generated by the pump 3 and the second volumetric flow $Q_{load}$ for displacement of the slave cylinder piston 9 along the actuation path x.

The electric motor 2 is designed as a brushless DC motor whose rotational parameters of a rotor, such as rotational angle θ, angular velocity $\dot\theta$ and angular acceleration $\ddot\theta$, are detected by means of an incremental angle sensor and evaluated by a control unit. Furthermore, the current i of the electric motor 2 for operating the pump 3 is detected and evaluated. The motor constant $K_e$, the efficiency η and the mass moment of inertia J of the rotor are known. From this, the first volumetric flow $Q_{pump}$ is determined at the calculated pressure p of the pressure medium 5 and its viscosity at a specified temperature. The second volumetric flow $Q_{load}$ is determined from the actuation speed $\dot x$, which is detected by a displacement sensor of the slave cylinder and evaluated by the control unit, and the known piston surface area $A_{piston}$. From this, the leakage $Q_{leakage}$ is determined according to equation (7). A progression of the leakage $Q_{leakage}$ over the service life of the hydraulic system 1 can be monitored by comparison with a leakage detected at the start of operation and, if necessary, a state of wear of the pump 3 can be determined from this.

Figure 2:
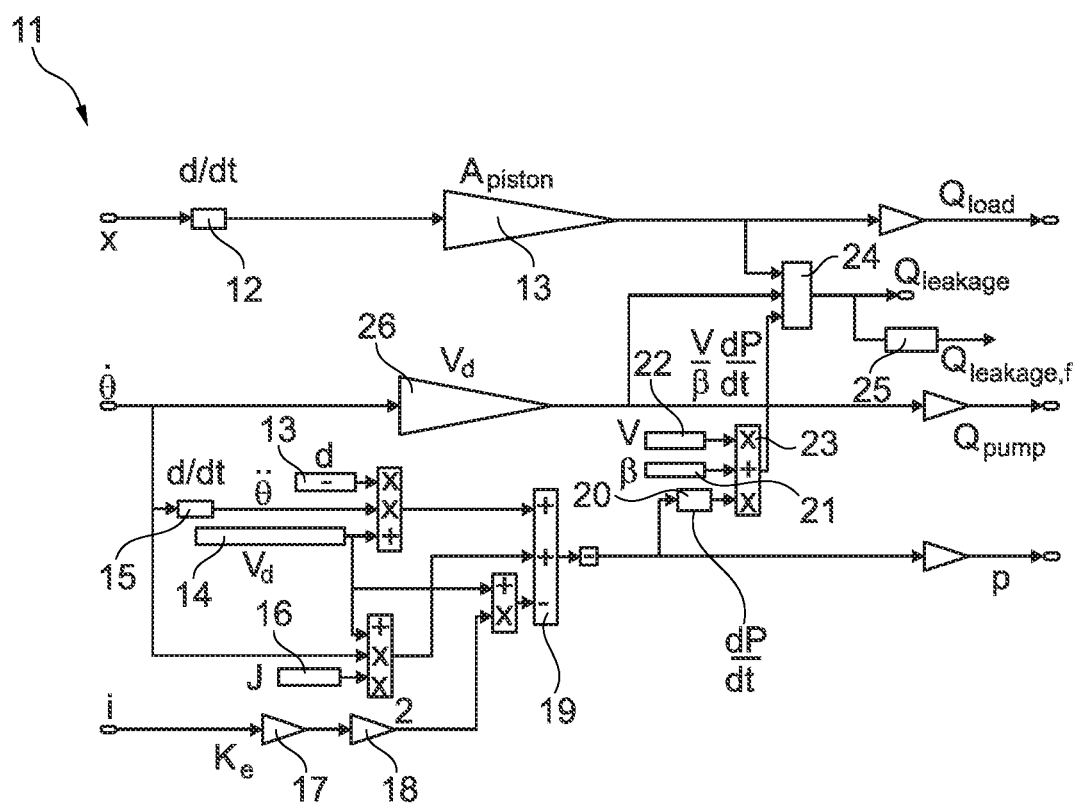
FIG. 2 shows a block diagram for determining the leakage of the hydraulic system of FIG. 1.

With reference to equations (1) to (7) and FIG. 1, FIG. 2 shows the block diagram 11 for determining the leakage $Q_{leakage}$ or filtered leakage $Q_{leakage,f}$ from the actuation path x, the angular velocity $\dot\theta$ of the electric motor 2 and the current i of the electric motor 2.

The second volumetric flow $Q_{load}$ is calculated from the actuation path x by means of differentiation d/dt in block 12 and the piston surface area $A_{piston}$ in block 13.

The angular velocity $\dot\theta$ and the volume $V_d$ displaced by pump 2 in block 26 are used to calculate the first volumetric flow $Q_{pump}$.

In parallel to this, the angular velocity $\dot\theta$, the current i as input variables and the damping d in block 13, the displaced volume $V_d$ in block 14, the angular acceleration $\ddot\theta$ determined from the differentiation d/dt in block 15, the mass moment of inertia J of the rotor in block 16, the motor constant $K_e$ in block 17 and the efficiency η in block 18 are used to determine the pressure p in block 19.

From the pressure p differentiated in block 20, the pump volume V in block 21 and the compressibility constant β, the variable V/β*dP/dt is formed in block 23 and fed to block 24. Block 24 is also supplied with the displaced volume $V_d$ from block 26 and the second volumetric flow $Q_{load}$, from which the leakage $Q_{leakage}$ is calculated. In block 25, the leakage $Q_{leakage}$ is filtered, resulting in the filtered leakage $Q_{leakage,f}$.

Figure 3:
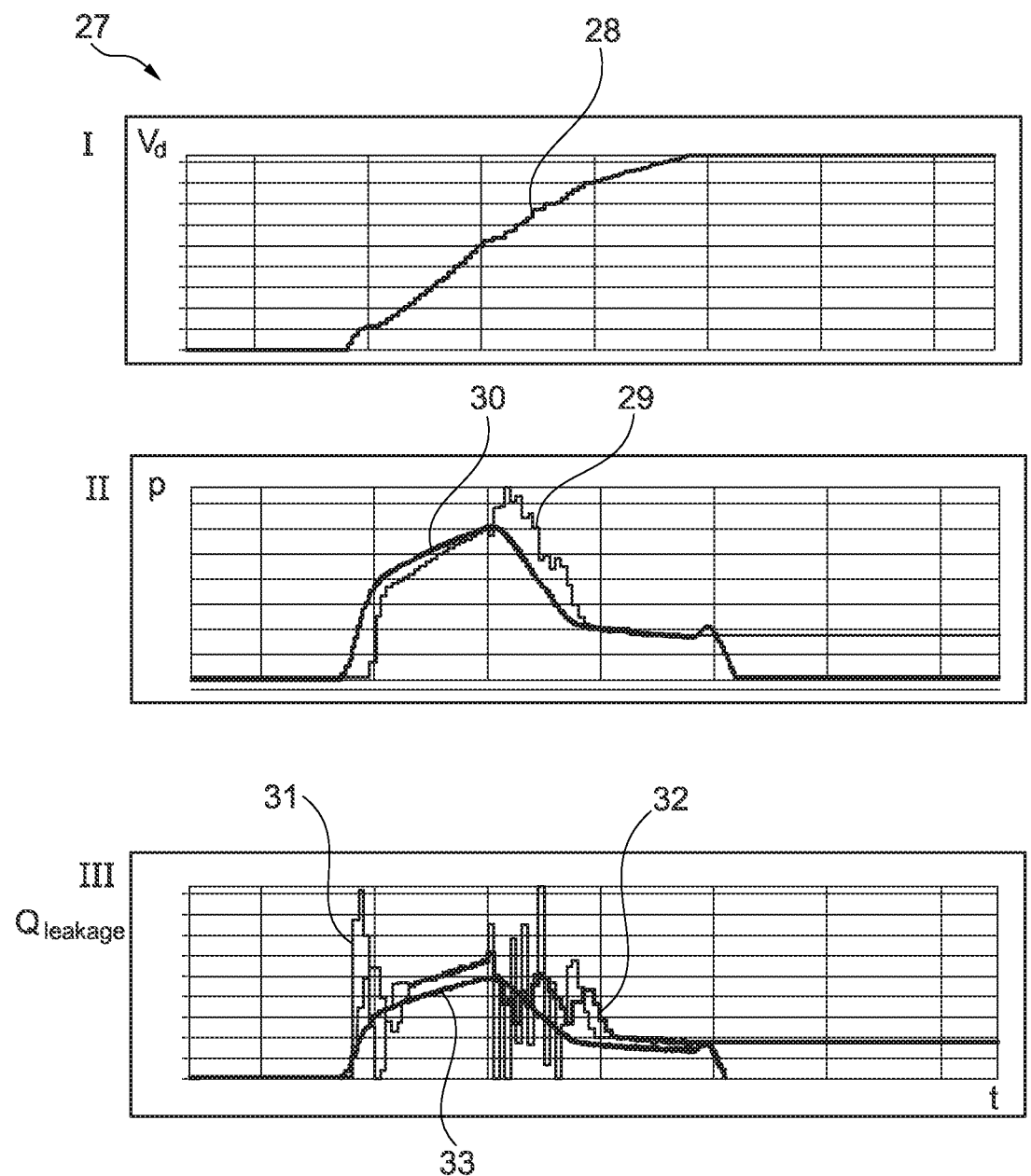
FIG. 3 shows a diagram with a simulation of an actuation of the slave cylinder of FIG. 1.

FIG. 3 shows, with reference to FIG. 1, the diagram 27 formed from the partial diagrams I, II, III over the time t during actuation of the slave cylinder piston 9 of the slave cylinder 8.

Curve 28 shown in partial diagram I shows the displaced volume $V_d$ of the pump 3 over the time t.

The partial diagram II shows the pressure p over the time t. Curve 29 shows a simulated behavior of the hydraulic system 1 according to equation (7). Curve 30 shows the behavior of the pressure of the pump 3.

The partial diagram III shows the leakage $Q_{leakage}$ over the time t with the leakage simulated based on equation (7) in curve 31, the filtered leakage in curve 32 and the measured leakage of the pump 3 in curve 33.

LIST OF REFERENCE SYMBOLS

1 Hydraulic system
2 Electric motor
3 Pump
4 Sump
5 Pressure medium
6 Pressure line
7 Switch valve
8 Slave cylinder
9 Slave cylinder piston
10 Arrow
11 Block diagram
12 Block
13 Block
14 Block
15 Block
16 Block
17 Block
18 Block
19 Block
20 Block
21 Block
22 Block
23 Block
24 Block
25 Block
26 Block
27 Diagram
28 Curve
29 Curve
30 Curve
31 Curve
32 Curve
33 Curve
$A_{piston}$ Piston surface area
d Damping
d/dt Differentiation
i Current
J Mass moment of inertia
$K_e$ Motor constant
P Pressure
$Q_{load}$ Second volumetric flow
$Q_{leakage}$ Leakage
$Q_{leakage,f}$ Leakage, filtered
$Q_{pump}$ First volumetric flow
t Time
V Pump volume
$V_d$ Displaced volume
x Actuation path
ẋ Actuation speed
β Compressibility constant
η Efficiency
θ̇ Angular velocity
θ̈ Angular acceleration

The invention claimed is:

1. A method for controlling a hydraulic system for actuating a drive train device of a drive train of a motor vehicle, comprising:
providing a first volumetric flow of a pressure medium via an electrically operated pump;
actuating, via a second volumetric flow generated from the first volumetric flow, a slave cylinder piston of a slave cylinder along an actuation path, in a manner controlled by a switch valve;
during actuation of the slave cylinder, determining the first volumetric flow from rotational parameters and an electric current of an electric motor driving the pump, and mechanical constants of the hydraulic system; and
determining a leakage in the hydraulic system from a comparison of the first and second volumetric flows.

2. The method according to claim 1, further comprising:
determining, in an initial state, a first leakage;
continuously comparing the first leakage with the leakage; and
determining a measure of the leakage from the comparison.

3. The method according to claim 1, further comprising:
neglecting a leakage of the slave cylinder and a leakage of the switch valve; and
associating the leakage with the pump.

4. The method according to claim 1, wherein one of the mechanical constants is a mass moment of inertia of a rotor of the electric motor.

5. The method according to claim 1, wherein the mechanical constants include at least one of a compressibility constant, a damping of the pressure medium, and a displaced volume of the pump.

6. The method according to claim 1, further comprising, during actuation of the slave cylinder, determining the second volumetric flow from a piston surface area of the slave cylinder piston and an actuation speed of the slave cylinder piston.

7. The method according to claim 1, further comprising determining the leakage in a temperature-compensated manner.

8. The method according to claim 7, wherein a viscosity of the pressure medium is compensated.

9. The method according to claim 7, wherein a temperature-dependent damping of the pressure medium is compensated.

10. A method for controlling a hydraulic system for actuating a drive train device of a drive train of a motor vehicle, the method comprising:
providing, via a pump, a first volumetric flow of a pressure medium to a switch valve;
controlling the switch valve to provide a second volumetric flow of the pressure medium to actuate a piston of a cylinder, wherein the second volumetric flow is generated from the first volumetric flow;

determining a pump leakage based on the first volumetric flow and the second volumetric flow; and detecting wear in the pump by comparing the determined leakage to an initial pump leakage determined in an initial state of the pump.

11. The method according to claim 10, further comprising, during actuation of the cylinder, determining the first volumetric flow based on rotational parameters and an electric current of an electric motor driving the pump, and mechanical constants of the hydraulic system.

12. The method according to claim 11, wherein one of the mechanical constants is a mass moment of inertia of a rotor of the electric motor.

13. The method according to claim 11, wherein the mechanical constants include at least one of a compressibility constant, a damping of the pressure medium, and a displaced volume of the pump.

14. The method according to claim 10, further comprising, during actuation of the cylinder, determining the second volumetric flow based on a piston surface area of the piston and an actuation speed of the piston.

15. The method according to claim 10, further comprising determining the pump leakage based additionally on neglecting a leakage of the switch valve and a leakage of the cylinder.

16. The method according to claim 10, further comprising determining the pump leakage in a temperature-compensated manner.

17. The method according to claim 16, wherein at least one of a viscosity of the pressure medium and a temperature-dependent damping of the pressure medium is compensated.

18. A method for controlling a hydraulic system for actuating a drive train device of a drive train of a motor vehicle, comprising:

providing a first volumetric flow of a pressure medium via an electrically operated pump;

actuating, via a second volumetric flow generated from the first volumetric flow, a slave cylinder piston of a slave cylinder along an actuation path, in a manner controlled by a switch valve;

determining a leakage in the hydraulic system from a comparison of the first and second volumetric flows;

determining, in an initial state, a first leakage;

continuously comparing the first leakage with the leakage; and determining a measure of the leakage from the comparison.

19. The method according to claim 18, further comprising, during actuation of the cylinder, determining the first volumetric flow based on rotational parameters and an electric current of an electric motor driving the pump, and a mass moment of inertia of a rotor of the electric motor.

20. The method according to claim 18, further comprising, during actuation of the cylinder, determining the first volumetric flow based on rotational parameters and an electric current of an electric motor driving the pump, and mechanical constants of the hydraulic system, wherein the mechanical constants include at least one of a compressibility constant, a damping of the pressure medium, and a displaced volume of the pump.

* * * * *